E. B. LENNIG.
THERMOSTATIC DEVICE.
APPLICATION FILED JUNE 26, 1917.
1,391,329.
Patented Sept. 20, 1921.
2 SHEETS—SHEET 1.
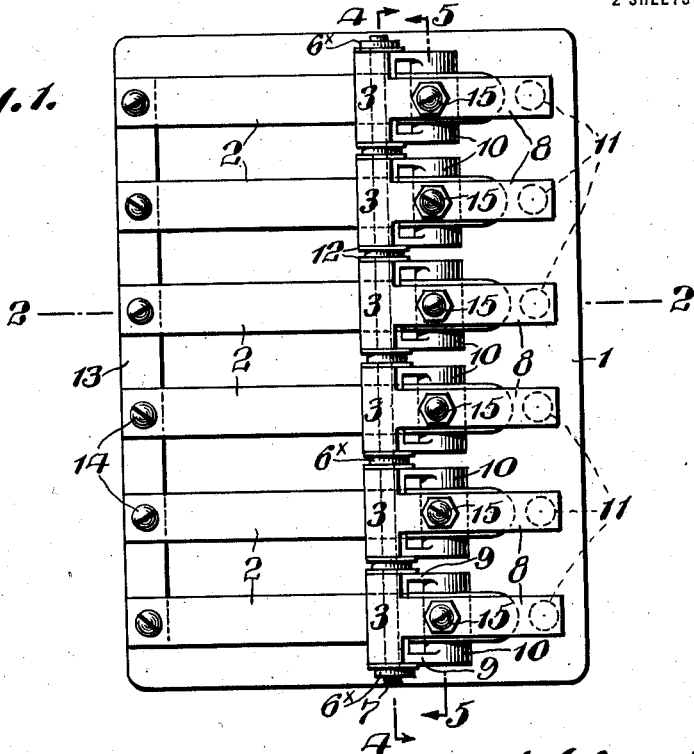
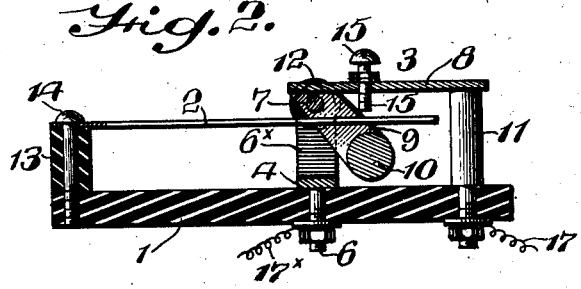
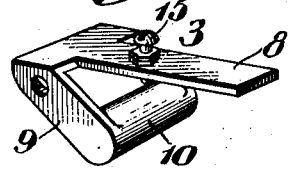
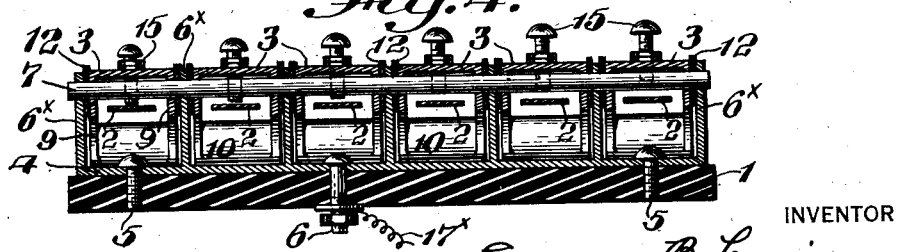
INVENTOR
Edmund B. Lennig.
BY Niedersheim Fairbanks,
ATTORNEYS

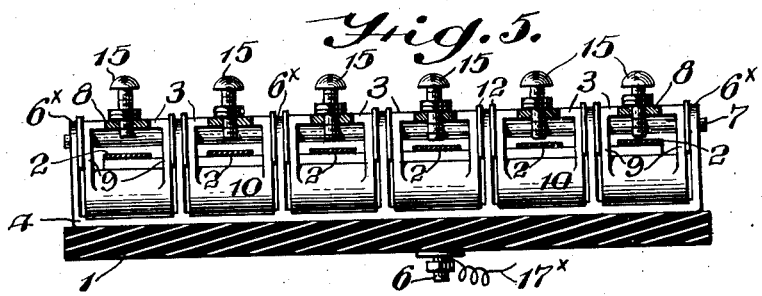
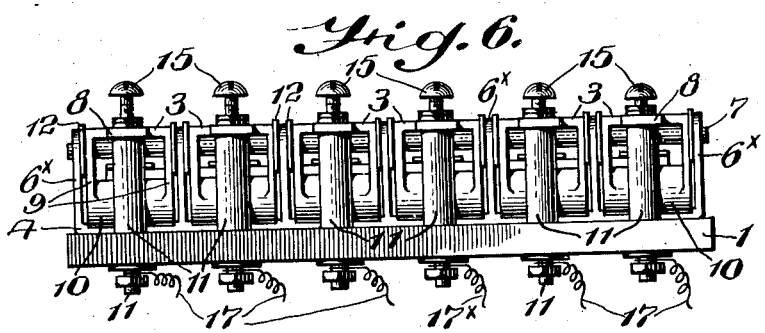
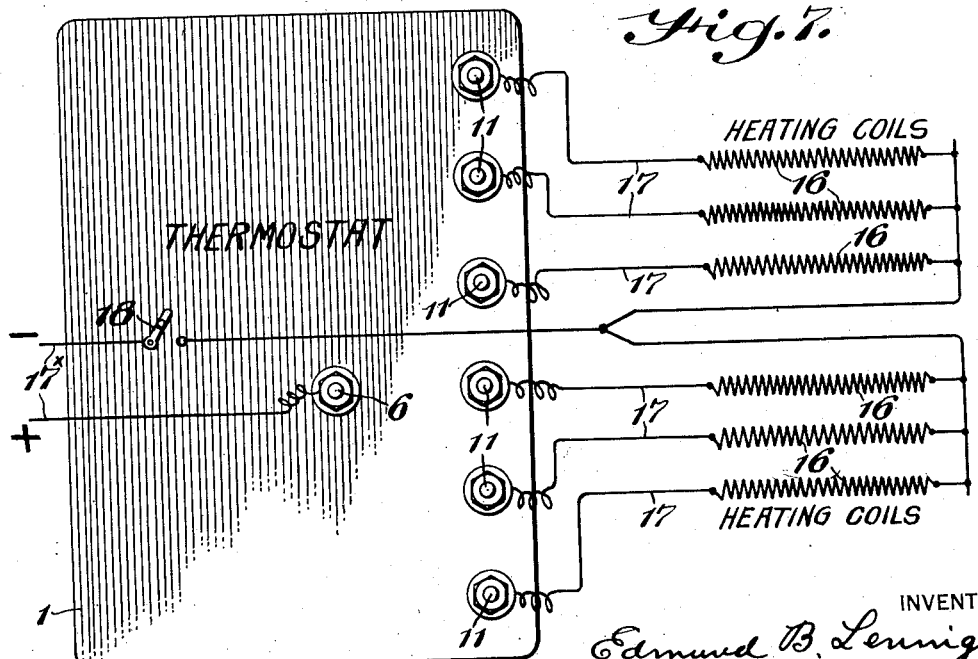

UNITED STATES PATENT OFFICE.

EDMUND B. LENNIG, OF SAN FRANCISCO, CALIFORNIA, ASSIGNOR TO THERMIC ENGINEERING CO., OF SAN FRANCISCO, CALIFORNIA, A CORPORATION OF CALIFORNIA.

THERMOSTATIC DEVICE.

1,391,329.  Specification of Letters Patent.  Patented Sept. 20, 1921.

Application filed June 26, 1917. Serial No. 177,084.

*To all whom it may concern:*

Be it known that I, EDMUND B. LENNIG, a citizen of the United States, residing in the city and county of San Francisco, State of California, have invented a new and useful Thermostatic Device, of which the following is a specification.

My invention comprehends a novel thermostatic device for controlling electrical and other devices included in circuit or in communication with said thermostatic device, together with novel means for adjusting said thermostatic device to automatically control said electrical devices according to the degree of temperature to which said thermostatic device is adjusted.

One object of my invention is to provide a novel thermostatic device consisting of a plurality of thermostats and a plurality of switches or contact members so arranged in relation to each other and provided with means to allow for varying temperature adjustment between said thermostats and switches to automatically control the electrical devices in electrical and thermal connection with the switches of said thermostat.

A further object of my invention is to provide a novel thermostatic device consisting of a movable switch provided with an adjustable device located intermediate the pivot and contact portion of the said switch, said adjusting device being adapted to be actuated by the free end of the thermostat blade to afford a multiplied movement to the switch at its contact portion in respect to a contact in the circuit, so as to insure positive making and breaking of the electric circuit to prevent sparking and fusing in the thermostatic device.

A further object of my invention is to provide a novel thermostatic device, wherein the time difference in the expansion and contraction of the thermostat in respect to the switch operated by the thermostat blade is equalized through the medium of a counterbalance weight forming a part of the switch and located out of the center of gravity of the pivot of said switch to normally include the switch in circuit with the electric device.

A further object of my invention is to provide a novel thermostatic device operative under various thermal conditions, such as atmospheric and liquid, together with a construction readily adjustable for existing conditions, with a novel arrangement and collocation of the various parts, that cannot be displaced in handling, provision being made to prevent short circuiting, sparking and fusing, together with the elimination of false temperature in the thermostat blades, which can be readily installed, and will be efficient in operation in connection with various electrical and other devices to minimize the supply of electric current necessary for the operation thereof.

A still further object of my invention is to provide a novel thermostatic device adapted for use in connection with electric or other devices, means being provided in connection with said thermostat and electrical devices to bring the electrical device to its required capacity, by simultaneously utilizing all the heating units of said electrical device controlled by the temperature adjusted switches of the thermostatic device, and means being further provided for automatically cutting out the excessive electric current from the minimum temperature when the required capacity of the electric device is reached to minimize the time necessary and the electric supply to hold the electrical device to its required capacity.

To the above ends my invention in its broad aspects consists of a novel construction of a switch or contact member and a novel collocation of a plurality of such switches or contact members, each of said switches having a laterally extending arm and a counterbalance located thereunder, so as to cause the automatic depressions of said arms to close an electric circuit, said arms being provided with adjusting screws coacting with thermostat blades in a novel manner.

For the purpose of illustrating my invention, I have shown in the accompanying drawings certain forms thereof which are at present preferred by me, since the same will be found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a plan view of a thermostatic device, showing one embodiment of my invention.

Fig. 2 represents a section on the line 2—2 of Fig. 1.

Fig. 3 represents a perspective view of one of the switches or contact members.

Fig. 4 represents a section on line 4—4 Fig. 1.

Fig. 5 represents a section on line 5—5 Fig. 1, showing a plurality of switches or contact members with different adjustments in respect to a plurality of thermostatic metallic strips.

Fig. 6 represents a front elevation of Fig. 1.

Fig. 7 represents a diagrammatic view, illustrating the electric wiring and connections of the device when used in conjunction with an electric heater or similar appliance.

Similar numerals of reference indicate corresponding parts in the figures.

Referring to the drawings:—

1 designates a base composed of insulating material upon which is mounted my novel thermostatic device, consisting of a plurality of thermostat blades 2, adapted to actuate a plurality of switches or contact members 3, according to varying degrees of temperature to control electrical devices included in the circuits with the thermostatic device.

4 designates a bus bar secured to the base 1 by the screws 5, and also provided with the binding post 6 in connection with any suitable source of electrical energy.

6× designates extensions or uprights forming a part of the bus bar 4, in which is positioned the shaft 7 to afford a mounting for the movable switches or contact members 3, whose construction will be understood from Fig. 3.

The contact members 3 consist of the outwardly or laterally extending contact arms 8 preferably formed integral with or secured to the downwardly and outwardly depending or diverging arms 9, which carry the counterbalance weights 10, which are located past the center of gravity of the pivot of said contact members to hold said contact arms 8 thereof normally in contact with the contact posts 11 in electrical connection with the electrical devices to be controlled by the thermostat, as hereafter fully described.

The shaft 7 acts as a conductor of electricity between the contact members 3 and the bus bar 4. 12 designates insulating washers located between the extensions 6× of the bus bar 4 and the contact members 3 to prevent sparking and fusing.

13 designates a block of insulating material carried by or forming a part of the base 1, and to which the thermostat blades 2 are secured by the screws 14, said thermostat blades extending inwardly past the pivot point of the contact member 3 and under the contact arms 8.

15 designates adjustable devices, preferably screws, provided with lock nuts, arranged in the contact members 3 and adapted to be adjusted to various positions in relation to the thermostat blades 2 to cause said thermostat blades 2 when expanded or contracted to actuate the contact members 3 according to the varying degrees of temperature to which said thermostatic blades 2 are subjected.

With the arrangement of devices between the thermostat blades 2 and the contact members 3 as above described, the point of actuation of the contact members 3 by said thermostat blades 2 is located intermediate the pivotal portion of said contact members 3, whereby a multiplied movement is obtained between the contact portion of the contact members 3 and the contacts 11 to assure a positive and effective making and breaking of the electric circuits 17 to prevent sparking and fusing.

To compensate for the difference in the expansion and contraction of the thermostat blade 2, and to equalize the same action in respect to the contact member 3, the counterweights 10 of the contact member 3 are provided and located at the proper point beyond the center of gravity of the contact member 3, as above explained.

In this device, the thermostat blades 2 are not included in the circuits 17, thereby eliminating false heat in the action of the thermostat blades.

Referring now to Fig. 7 of the drawings, an electric wiring diagram is shown, illustrating one use of my invention in connection with an electric heating appliance, consisting of a plurality of heating coils 16 and a plurality of switches 3, which it will be understood are on the opposite side of the base 1, seen in Fig. 7, thermostatically controlled included in the electric circuits 17 independent of each other and in circuit with the main service circuit 17× for controlling the energizing and deënergizing of said heating coils 16 either independent of each other or collectively.

The switch 18 is provided in the main service circuit 17× for starting the device to include all the heating coils 16 in electric circuit.

It will of course be understood that with a reversal of the thermostat blades 2 and a slight readjustment of the adjusting means 15 of the contact members 3 the device may be operative with electrical devices where cold temperatures are employed.

The operation is as follows:—

It will be understood that my novel thermostatic device is adapted for use in connection with various electrical or other devices, but for convenience of description and illustration, I have illustrated in Fig. 7 an electric heating device consisting of the heating coils 16 included in the circuits 17 of the thermostatic device.

Referring to Fig. 5 of the drawings, the adjustable means or screw 15 of the switches or contact members 3 are adjusted in relation to the thermostat blades 2 to be operated thereby in the expansion and contraction thereof, according to the varying degrees of temperature to which said thermostat blades are subjected.

Assuming the desired temperature to be produced is 190° at maximum, the adjusting screws 15 carried by the arms 8 of the various contact members 3 will be set in operation at different progressive temperature adjustments between a minimum temperature at 175° and the maximum temperature of 190°, as will be noted from the position of the adjusting screws 15, seen in Fig. 5, reading from right to left. In starting the device the switch 18 is closed and the electric circuits are completed to simultaneously energize all the heating coils 16 until the temperature in the electrical device gradually rises to successively and automatically cut out the switches 3 controlling corresponding heating coils 16 from the minimum temperature until the device reaches its maximum temperature at which time the electrical device is to be held at such temperature by one or more heating coils supported by the intermittent energizing and deënergizing of the preceding heating coils due to an intermittent action of a corresponding thermostatic switch caused by a falling or rising in the temperature of the electrical device when heated to the substantial maximum temperature.

I desire to call especial attention to the construction and manner of mounting of the switch or contact member 3, seen in Fig. 3, comprising the laterally extending arm 8 and the downwardly diverging arms 9, having the counterbalance 10 located at one side of the pivotal support, or, in other words, outside of the center of gravity of said switch.

By this construction, when the parts are assembled, it will be apparent that the arm or arms 8 always are automatically depressed by gravity so as to rest on the contact posts 11 and tend to close the circuit between the members 8 and 11, said circuit being broken or opened when the expansion of the blade or blades 2 occurs to a sufficient extent to effect a contact with and elevate the adjusting screw 15 and the arm 8 carrying the same.

It will now be apparent that I have devised a novel and useful thermostatic device, which embodies the features of advantage enumerated as described in the statement of the invention and the above description, and while I have, in the present instance, shown and described typical embodiments of it which will give in practice satisfactory and reliable results, it is to be understood that these embodiments are susceptible of modification in various particulars without departing from the spirit or scope of the invention or sacrificing any of its advantages.

Having thus described my invention, what I claim as new and desire to secure by Letters Patent, is:—

1. In a thermostat device, a pivoted switch having a laterally extending arm, an adjustable screw projecting through said arm, a counterbalance carried by said arm, below the latter and at one side of its center of gravity of said arm to effect the automatic depression of said arm, a contact post with which said arm normally contacts, and a thermostat, located above said counterbalance, extending in substantial parallelism with said arm and coöperating with the lower end of said screw to move said arm out of contact with said contact post.

2. A thermostat device comprising a switch, having a laterally extending arm, inclined arms depending downwardly therefrom, a counterbalance carried by said depending arms and located under said lateral arm to automatically depress said lateral arm, an adjustable screw in said laterally extending arm, a binding post with which said laterally extending arm normally contacts, and a thermostat blade extending through said depending arms and located above said counterbalance and coöperating with the lower end of said screw to effect the opening of the circuit by moving said laterally extending arm away from said binding post.

3. A thermostat device comprising a thermostat blade and a switch pivotally supported above said blade and in proximity therewith, said switch having a laterally extending arm, an adjusting screw passing through said arm and engaged by the top of said blade to open a circuit, a counterbalance carried by said arm and located below said arm and blade and positioned outside of the center of gravity of said switch, and a binding post on which said arm normally rests.

4. A thermostat device comprising an insulating base, a bus bar secured to said base, a switch member journaled on said bus bar and having a laterally extending arm, an adjusting screw passing through said arm, and a counterbalance positioned below said arm outside of the center of gravity of said arm, a binding post on which said arm normally rests, and a thermostat blade located above said counterbalance and adapted to engage said adjusting screw to move said arm out of contact with said binding post.

EDMUND B. LENNIG.

Witnesses:
E. HAYWARD FAIRBANKS,
C. D. McVAY.